United States Patent
Zhao

(10) Patent No.: US 10,495,955 B2
(45) Date of Patent: Dec. 3, 2019

(54) METHOD AND APPARATUS FOR CONTROLLING PROJECTOR

(71) Applicant: Baidu Online Network Technology (Beijing) Co., Ltd., Beijing (CN)

(72) Inventor: Chen Zhao, Beijing (CN)

(73) Assignee: BAIDU ONLIN NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/169,272

(22) Filed: Oct. 24, 2018

(65) Prior Publication Data
US 2019/0302581 A1    Oct. 3, 2019

(30) Foreign Application Priority Data
Mar. 27, 2018  (CN) .......................... 2018 1 0258628

(51) Int. Cl.
*G03B 21/14*        (2006.01)
*H04N 5/74*         (2006.01)
*G05B 19/042*       (2006.01)

(52) U.S. Cl.
CPC ......... *G03B 21/142* (2013.01); *G05B 19/042* (2013.01); *H04N 5/74* (2013.01)

(58) Field of Classification Search
CPC .... G03B 21/008; G03B 21/28; G03B 21/142; G03B 21/208; G03B 21/2013; G03B 21/2066; G02B 26/106; G02B 26/101; G02B 26/012; G02B 26/126; G02B 26/0833; H04N 9/315; H04N 9/3129; H04N 9/3152; H04N 9/3161
See application file for complete search history.

(56) References Cited

U.S. PATENT DOCUMENTS

| | | | |
|---|---|---|---|
| 6,728,488 B1* | 4/2004 | Peng | G02B 27/09 359/639 |
| 2005/0128578 A1* | 6/2005 | Sugawara | H04N 5/74 359/443 |
| 2006/0262243 A1* | 11/2006 | Lester | G02F 2/02 349/71 |
| 2014/0002876 A1* | 1/2014 | Yankov | G02B 5/32 359/15 |
| 2014/0211000 A1* | 7/2014 | Herman | G02B 26/0833 348/136 |
| 2015/0036105 A1* | 2/2015 | Ide | H04N 9/3129 353/31 |
| 2018/0284284 A1* | 10/2018 | Curatu | G01S 17/10 |

* cited by examiner

*Primary Examiner* — Sultan Chowdhury
(74) *Attorney, Agent, or Firm* — Knobbe, Martens, Olson & Bear, LLP

(57) ABSTRACT

Methods and apparatuses for controlling a projector are provided. In some embodiments, a method includes: controlling the light source to emit point structured light to a reflector; and adjusting a tilt angle of the reflector to change the tilt angle of the reflector, and to enable the point structured light reflected from the reflector to an optical conversion device to deflect towards a preset scanning direction. The optical conversion device is used for converting the point structured light incident onto the optical conversion device into line structured light. The line structured light is used for forming a pattern that is projected onto a surface of a target object and extends along a direction intersecting with the preset scanning direction. Improved efficiency in three-dimensional scanning of a target object can be achieved.

10 Claims, 6 Drawing Sheets

METHOD AND APPARATUS FOR CONTROLLING PROJECTOR

CROSS-REFERENCE TO RELATED APPLICATIONS

This application claims priority to Chinese Patent Application No. 201810258628.X, filed on Mar. 27, 2018, titled "Method and Apparatus for Controlling Projector," which is hereby incorporated by reference in its entirety.

TECHNICAL FIELD

Embodiments of the disclosure relate to the field of computer technology, and specifically to a method and apparatus for controlling a projector.

BACKGROUND

The three-dimensional scanning is mainly used for scanning an outer surface of an object, and expressing the same as numerals. The numerals are acquired as, for example, point clouds including X, Y, and Z coordinates (denoting the outer surface of the object).

During three-dimensional scanning, a group of light patterns constructed using a mathematical method may be projected to illuminate the measured object in a certain order, and synchronously capture the image of the illuminated object. The captured light pattern is modulated by the surface shape of the object relative to the datum surface, so that the coordinates of each point on the surface of the object may be calculated according to the geometrical triangulation principle.

SUMMARY

Embodiments of the disclosure provide a method and apparatus for controlling a projector.

In a first aspect, an embodiment of the disclosure provides a method for controlling a projector. The projector includes a light source, a reflector, and an optical conversion device. The method includes: controlling the light source to emit point structured light to the reflector; and adjusting a tilt angle of the reflector to change the tilt angle of the reflector, to deflect, along a preset scanning direction, the point structured light reflected from the reflector to the optical conversion device. The optical conversion device is configured for converting the point structured light incident onto the optical conversion device into line structured light. The line structured light is used for forming a pattern that is projected onto a surface of a target object and extends along a direction intersecting with the preset scanning direction.

In some embodiments, the method further includes: acquiring an image of the target object; and generating a depth image based on the pattern projected onto the surface of the target object and the image.

In some embodiments, the reflector is a MEMS mirror, and the optical conversion device is a diffractive optical element.

In some embodiments, the reflector is the MEMS mirror, and the optical conversion device is a grating element.

In a second aspect, an embodiment of the disclosure provides a method and apparatus for controlling a projector. The projector includes a light source, a reflector, and an optical conversion device. The apparatus includes: a light source control unit configured for controlling the light source to emit point structured light to the reflector; and a tilt angle adjusting unit configured for adjusting a tilt angle of the reflector to change the tilt angle of the reflector, to deflect, along a preset scanning direction, the point structured light reflected from the reflector to the optical conversion device. The optical conversion device is configured for converting the point structured light incident onto the optical conversion device into line structured light. The line structured light is used for forming a pattern that is projected onto a surface of a target object and extends along a direction intersecting with the preset scanning direction.

In some embodiments, the apparatus further includes: an image acquisition unit configured for acquiring an image of the target object; and a depth image generation unit configured for generating a depth image based on the pattern projected onto the surface of the target object and the image.

In some embodiments, the reflector is a MEMS mirror, and the optical conversion device is a diffractive optical element.

In some embodiments, the reflector is the MEMS mirror, and the optical conversion device is a grating element.

In a third aspect, an embodiment of the disclosure provides an electronic device, including: a controller including one or more processors; a light source; a reflector; an optical conversion device; and a memory for storing one or more programs. The one or more programs, when executed by the controller, cause the controller to implement the method according to any one of the implementations in the first aspect.

In a fourth aspect, an embodiment of the disclosure provides a computer readable medium storing a computer program therein. The computer program, when executed by a processor, causes the processor to implement the method according to any one of the implementations in the first aspect.

The method and apparatus for controlling a projector according to the embodiments of the disclosure control a light source to emit point structured light to a reflector, then adjust a tilt angle of the reflector to deflect the point structured light reflected from the reflector to an optical conversion device along a preset scanning direction, then convert the point structured light incident onto the optical conversion device into line structured light by the optical conversion device, and then project the line structured light onto a surface of a target object, thereby improving the efficiency in three-dimensional scanning of the target object.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
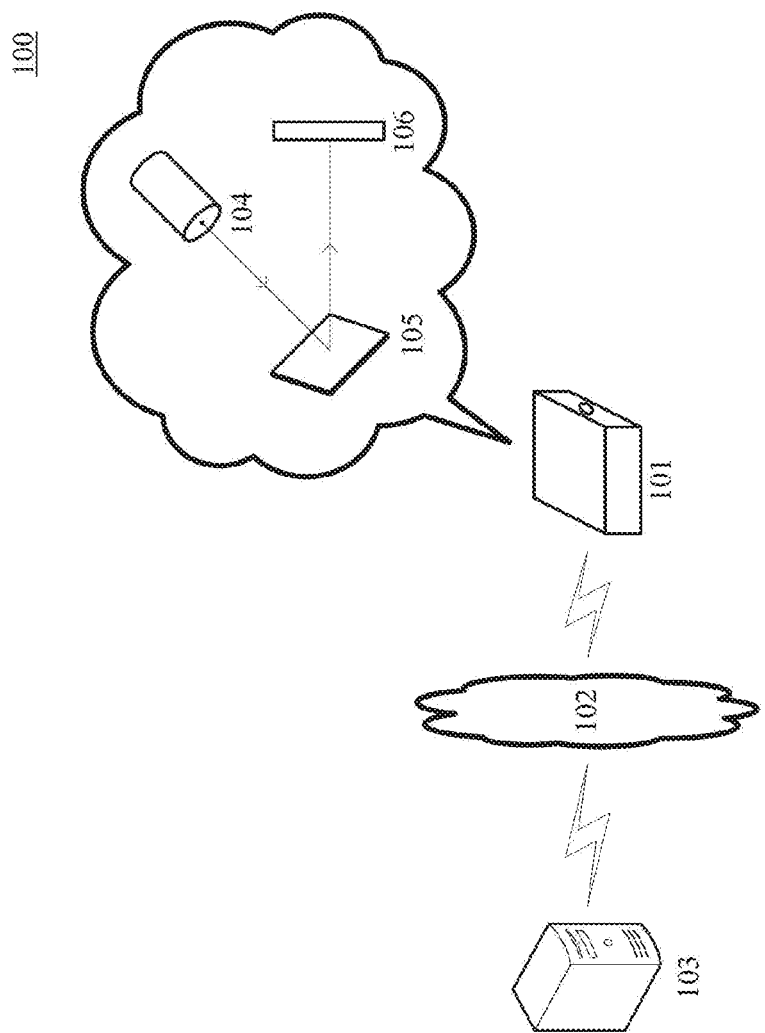
FIG. 1 is an exemplary architecture of a system in which some embodiments of the disclosure may be applied.

FIG. 1 shows an exemplary architecture of a system 100 in which some embodiments of the disclosure may be applied.

As shown in FIG. 1, the system architecture 100 may include a projector 101, a network 102, and a controller 103. The network 102 serves as a medium providing a communication link between the projector 101 and the controller 103. The network 102 may include various types of connections, such as wired or wireless transmission links, or optical fibers.

The projector 101 may interact with the controller 103 through the network 102, to receive or send messages. The projector 101 may be provided with a light source 104, a reflector 105, and an optical conversion device 106. The light source 104 is used for emitting point structured light to the reflector 105, the reflector 105 is used for reflecting the point structured light incident onto the reflector 105 to the optical conversion device 106, and the optical conversion device 106 is configured for converting the point structured light incident onto the optical conversion device 106 into line structured light.

The controller 103 may be installed on the projector 101, or not be installed on the projector 101. The controller 103 is used for controlling the projector 101 in various aspects. For example, the controller 103 may control the light source 104 to emit point structured light to the reflector 105, and the controller 103 may also adjust a tilt angle of the reflector 105 to reflect the point structured light incident onto the reflector 105 to the optical conversion device 106.

It should be noted that the method for controlling a projector according to the embodiment of the disclosure is generally executed by the controller 103. Accordingly, the apparatus for controlling a projector is generally arranged in the controller 103.

It should be noted that the controller may be hardware, or software. When the controller is hardware, the controller may be implemented as a distributed device cluster including a plurality of devices, or be implemented as a standalone device. When the controller is software, it may be implemented as a plurality of software systems or software modules (e.g., for providing a distributed service), or be implemented as a single software system or software module, which is not specifically limited here.

It should be understood that the numbers of projectors, networks, control terminals, light sources, reflectors, and optical conversion devices in FIG. 1 are merely illustrative. Any number of projectors, networks, control terminals, light sources, and reflectors may be provided based on the actual requirements.

Figure 2:
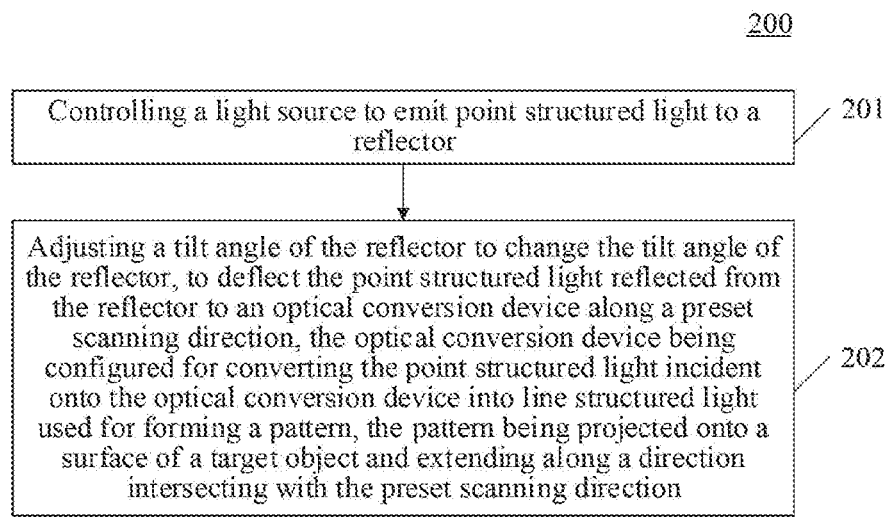
FIG. 2 is a flow chart of an embodiment of a method for controlling a projector according to the disclosure.

Further reference is made to FIG. 2, which shows a flow 200 of an embodiment of a method for controlling a projector according to the disclosure. The flow 200 of the method for controlling a projector includes steps 201 and 202.

Step 201 includes: controlling a light source to emit point structured light to a reflector.

In the embodiment, the projector (e.g., the projector in FIG. 1) may include the light source, the reflector, and the optical conversion device. An executive subject (e.g., the controller shown in FIG. 1) of the method for controlling a projector may control the light source to emit point structured light to the reflector.

Here, the controlling the light source may be implemented by the executive subject through sending a light emission instruction (e.g., an instruction of "emitting point structured light") to the projector, or be implemented in other appropriate way. For example, whether to emit the point structured light to the reflector is controlled by adding a light chopper between the light source and the reflector. The controlling way is not limited in the disclosure.

In some optional implementations of the embodiment, the light source may be a laser light source. Due to excellent directivity, the laser light source may form a clear structured light pattern on a surface of a target object. The laser light source may be a monochromatic light source, e.g., a red laser light source, a green laser light source, or a blue laser light source.

In some optional implementations of the embodiment, the reflector may be a MEMS (micro electro mechanical system) mirror. The MEMS refers to a micro-device or system that integrates precision processing technologies, such as photoetching, corrosion, and thin film, based on microelectronic technology, and has a production size of a few millimeters or even smaller. The MEMS mirror may have a size of 1 mm to 2 mm, or even smaller. Compared with the conventional reflector, the MEMS mirror may reduce the size of the projector, and reduce costs.

In some optional implementations of the embodiment, the optical conversion device may be a diffractive optical element. The diffractive optical element (DOE for short) may include a plurality of lenses. The DOE can precisely control light intensity distribution while maintaining a high diffraction efficiency. The lenses in the DOE are precisely controlled, thereby implementing converting the point structured light into the line structured light.

In some optional implementations of the embodiment, the optical conversion device may be a grating element. The grating is an optical device that is formed by many fine, equidistant, parallel, equally spaced grooves (e.g., by cutting a surface of a glass sheet or a surface plated with a metal layer to form many parallel cuttings). The grating may include, for example, a transmittance grating diffracting transmitted light, and a reflection grating diffracting reflected light, and may convert the point structured light incident onto the grating to the line structured light by precisely controlling the grooves.

In the embodiment, the benefits of using the diffractive optical element or the grating element are that when the light source is a point light source (e.g., a laser source), the point structured light is converted into the line structured light using the diffractive optical element or the grating element: on the one hand, the reflector may achieve three-dimensional scanning of the target object only by scanning once along a preset scanning direction, thereby greatly improving the efficiency of the three-dimensional scanning; on the other hand, since the reflector only needs to scan once along the preset scanning direction, a reflector rotating around a single axis may be used, thereby reducing the difficulty in controlling the reflector, simplifying the structural design of the reflector, and reducing the control cost and design cost of the projector.

Step 202 includes: adjusting a tilt angle of the reflector to change the tilt angle of the reflector, to deflect the point structured light reflected from the reflector to an optical conversion device along a preset scanning direction. The optical conversion device is configured for converting the point structured light incident onto the optical conversion device into line structured light. The line structured light is used for forming a pattern that is projected onto a surface of a target object and extends along a direction intersecting with the preset scanning direction.

In the embodiment, an executive subject (e.g., the controller shown in FIG. 1) of the method for controlling a projector may adjust the tilt angle of the reflector, e.g., rotate the projector along a rotation axis, to constantly change the tilt angle of the reflector (i.e., constantly changing a propagation direction of light). With the rotation of the tilt angle of the reflector, the point structured light reflected from the reflector to the optical conversion device is deflected along the preset scanning direction. Accordingly, the line structured light converted from the point structured light reflected onto the optical conversion device is also deflected along the preset scanning direction. Thus, a structured light pattern (e.g., a stripe pattern) is formed on the surface of the target object, thereby achieving the three-dimensional scanning (or projection) of the target object.

The optical conversion device is an optical device of converting point structured light incident onto the optical conversion device into the line structured light. The point structured light is used for forming a dot pattern on a surface of an object, and the line structured light is used for forming a line pattern extending along a specific direction on the surface of the object. In the embodiment, the line structured light obtained by the optical conversion device through converting the point structured light may form a line pattern (such as a line) along a direction intersecting (for example, perpendicularly) with the preset scanning direction on the surface of the target object.

Here, the adjusting a tilt angle of the reflector may be implemented by the executive subject through sending a tilt angle adjusting instruction (e.g., an instruction of "clockwise rotation along the rotation axis by one degree") to the projector, or be implemented in other appropriate way. For example, the adjusting a tilt angle of the reflector is implemented by a transmission component mechanically connected with the reflector. The adjustment way is not specifically limited in the disclosure, as long as the point structured light reflected from the reflector to the optical conversion device is deflected along the preset scanning direction.

Figure 3:
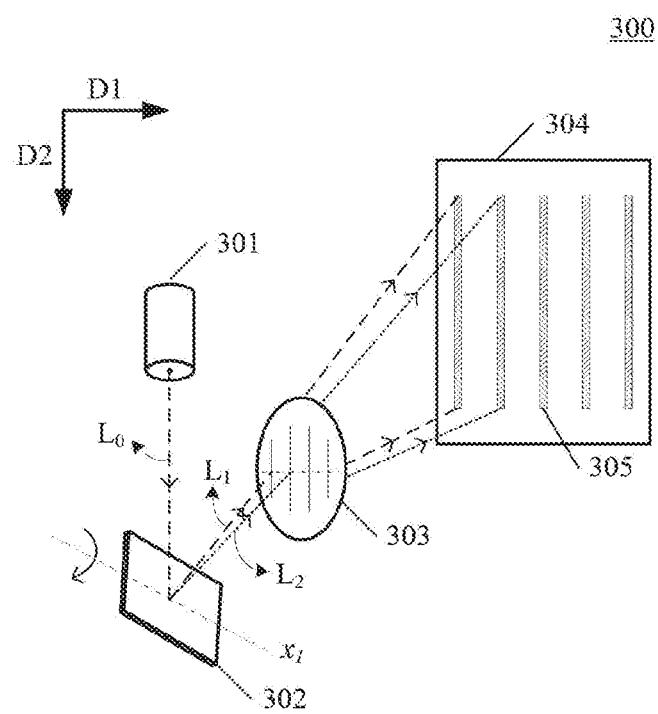
FIG. 3 is a schematic diagram of an application scenario of a method for controlling a projector according to some embodiments of the disclosure.

Further reference is made to FIG. 3. FIG. 3 is a schematic diagram of an application scenario 300 of a method for controlling a projector according to an embodiment. In the application scenario 300 in FIG. 3, first, the controller (not shown) controls a light source 301 to control the light source 301 to emit point structured light L0 to a reflector 302; then, the controller adjusts a tilt angle of the reflector 302 (e.g., clockwise rotation along a rotation axis x1) to change the tilt angle of the reflector 302, and to deflect the point structured light (e.g., point structured light L1) reflected from the reflector 302 to an optical conversion device 303 along the preset scanning direction D1 (e.g., as the reflector 302 rotates clockwise along the rotation axis x1, the point structured light L1 reflected to the optical conversion device 303 is deflected along the preset scanning direction D1 accordingly, e.g., deflected to a position of point structured light L2); and finally, the point structured light (e.g., point structured light L1, L2, etc.) is converted into line structured light through the optical conversion device 303, and is projected onto a surface of a target object 304, to form a stripe pattern including a plurality of lines 305, where an extension direction D2 of the line 305 intersects with the preset scanning direction D1 (e.g., perpendicularly), thus achieving three-dimensional scanning (or projection) of the target object 304.

It should be noted that, although a pattern projected onto the surface of the target object at any specific moment is a line, the controller in this scenario may control the projector to scan at a high speed. For example, it takes less than 1/60 seconds, 1/120 seconds, or the like (corresponding to a sensing frequency of an image sensor of 60 Hz, 120 Hz, etc.) to scan a frame of the target object. Due to a visual persistence effect (or known as afterglow), the effect is equivalent to directly projecting a complete stripe pattern including a plurality of lines onto the surface of the target object, an image acquired by the executive subject includes information of a complete stripe pattern of one scanned frame.

FIG. 3 illustrates the extension direction D2 of the line 305 perpendicularly intersecting with the preset scanning direction D1, which is merely illustrative. It should be understood that the extension direction D2 of the line 305 may not perpendicularly intersect with the preset scanning direction D1, which may be set by those skilled in the art based on actual needs in the application scenario.

The method for controlling a projector according to the embodiments of the disclosure controls a light source to emit point structured light to a reflector, then adjusts a tilt angle of the reflector to deflect the point structured light reflected from the reflector to an optical conversion device along a preset scanning direction, then converts the point structured light incident onto the optical conversion device into line structured light by the optical conversion device, and then projects the line structured light onto a surface of a target object, thereby improving the efficiency in three-dimensional scanning of the target object.

Figure 4:
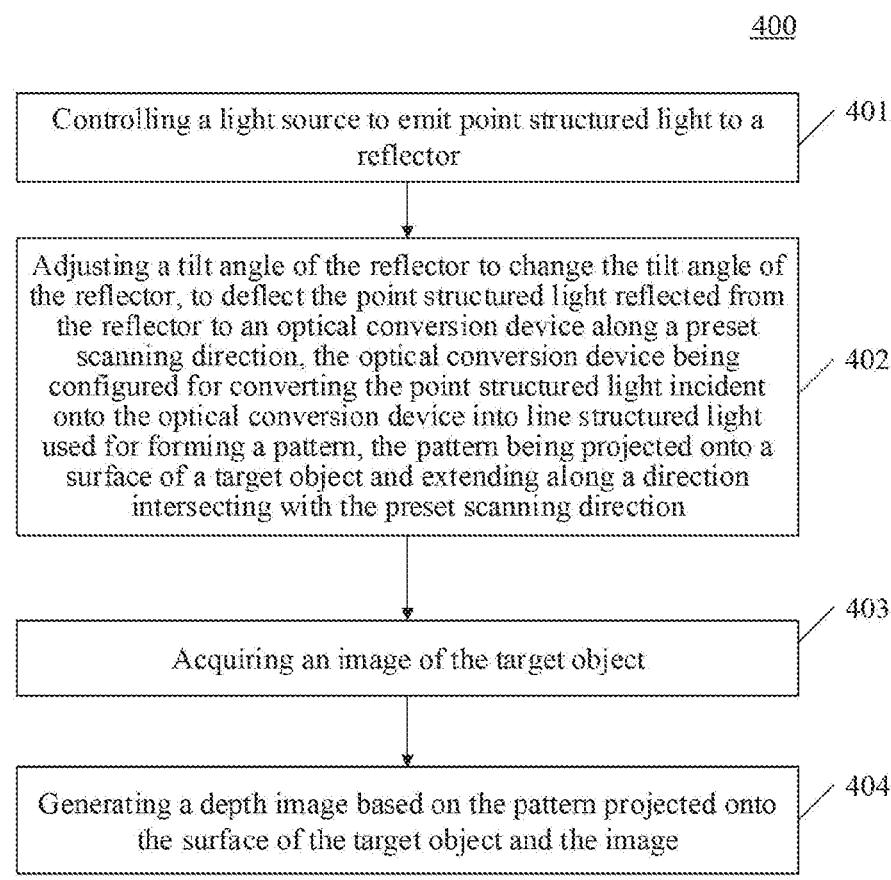
FIG. 4 is a flow chart of another embodiment of a method for controlling a projector according to the disclosure.

Further reference is made to FIG. 4, which shows a flow 400 of another embodiment of a method for controlling a projector. The process 400 of the method for controlling a projector includes steps 401 to 404.

Step 401 includes: controlling a light source to emit point structured light to a reflector.

In the embodiment, the projector (e.g., the projector in FIG. 1) may include a light source, a reflector, and an optical conversion device. An executive subject (e.g., the controller shown in FIG. 1) of the method for controlling a projector may control the light source to emit point structured light to the reflector.

Step 402 includes: adjusting a tilt angle of the reflector to change the tilt angle of the reflector, to deflect the point structured light reflected from the reflector to an optical conversion device along a preset scanning direction. The optical conversion device is configured for converting the point structured light incident onto the optical conversion device into line structured light. The line structured light is used for forming a pattern that is projected onto the surface of the target object and extends along a direction intersecting with the preset scanning direction.

In the embodiment, an executive subject (e.g., the controller shown in FIG. 1) of the method for controlling a projector may adjust the tilt angle of the reflector, e.g., rotate the projector along a rotation axis, to constantly change the tilt angle of the reflector (i.e., constantly changing a propagation direction of light). With the rotation of the tilt angle of the reflector, the point structured light reflected from the reflector to the optical conversion device is deflected along a preset scanning direction. Accordingly, the line structured light converted from the point structured light reflected onto the optical conversion device is also deflected along the preset scanning direction. Thus, a structured light pattern (e.g., a stripe pattern) is formed on the surface of the target object, thereby achieving the three-dimensional scanning (or projection) of the target object.

The optical conversion device is an optical device of converting point structured light incident onto the optical conversion device into the line structured light. The point structured light is used for forming a dot pattern on a surface of an object, and the line structured light is used for forming a line pattern extending along a specific direction on the surface of the object. In the embodiment, the line structured light obtained by the optical conversion device through converting the point structured light may form a line pattern (such as a line) along a direction intersecting (for example, perpendicularly) with the preset scanning direction on the surface of the target object.

Step 403 includes: acquiring an image of target data.

In the embodiment, the executive subject (e.g., the controller shown in FIG. 1) of the method for controlling a projector may acquire an image of the target object with a structured light pattern (e.g., a stripe pattern) projected onto the surface. Here, the image of the target object may be acquired by an image sensor installed on the projector, e.g., acquired by a monocular/binocular photographing component installed on the projector. The image of the target object may also be acquired by an external image sensor (e.g., other camera, video camera, or the like in communication link with the executive subject), and then be acquired by the executive subject.

It should be noted that, although a pattern projected onto the surface of the target object at any specific moment is a line, the controller in the embodiment may control the projector to scan at a high speed. For example, it takes less than 1/60 seconds, 1/120 seconds, or the like (corresponding to a sensing frequency of an image sensor of 60 Hz, 120 Hz, etc.) to scan a frame of the target object. Due to a visual persistence effect (or known as afterglow), the effect is equivalent to directly projecting a complete stripe pattern including a plurality of lines onto the surface of the target object, and an image acquired by the executive subject includes information of a complete stripe pattern of one scanned frame.

Step 404 includes: generating a depth image based on the pattern projected onto the surface of the target object and the image.

In the embodiment, the executive subject (e.g., the controller shown in FIG. 1) of the method for controlling a projector may generate a depth image based on the pattern projected onto the surface of the target object and the image of the target object acquired in the step 403. The depth image may be an image that contains information about the distance from a surface of a scenario object (e.g., the target object) of a viewpoint. The depth image is similar to a grayscale image, except that a pixel value (e.g., a grayscale value) of each pixel point in the depth image is used for characterizing a distance from a point to a sensor (e.g., an image sensor) in a scenario.

Structured light projected onto the surface of the target object is modulated by a surface height of the target object. Phase, light intensity, and other properties of the modulated structured light may have corresponding changes, and depth information (e.g., the depth image) of the target object may be obtained by acquiring changes of the properties of the structured light. Therefore, the depth image of the target object may be generated by comparative analysis on the pattern projected onto the surface of the target object (i.e., the structured light pattern displayed along the projection direction) and the modulated structured light pattern acquired by the image sensor.

As can be seen from FIG. 4, compared with the embodiment corresponding to FIG. 2, the flow 400 of the method for controlling a projector according to the embodiment highlights generating the depth image of the target object. Thus, the solution according to the embodiment may be applied to scenarios of distance measurement and three-dimensional reconstruction of the target object.

Figure 5:
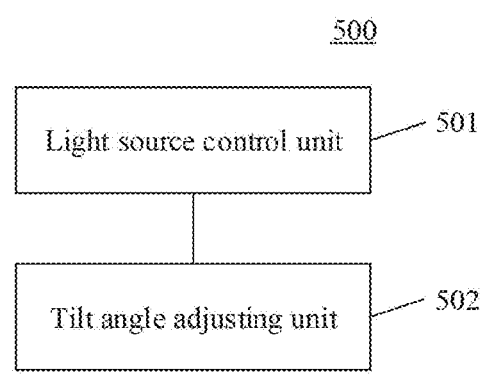
FIG. 5 is a structural schematic diagram of an embodiment of an apparatus for controlling a projector according to the disclosure.

Further reference is made to FIG. 5. As an implementation of the method shown in the above figures, the disclosure provides an embodiment of an apparatus for controlling a projector. The embodiment of the apparatus corresponds to the embodiment of the method shown in FIG. 2. The apparatus may be specifically applied to, e.g., a controller.

As shown in FIG. 5, the apparatus 500 for controlling a projector according to an embodiment includes: a light source control unit 501, and a tilt angle adjusting unit 502. The light source control unit 501 is configured for controlling the light source to emit point structured light to the reflector; and the tilt angle adjusting unit 502 is configured for adjusting a tilt angle of the reflector to change the tilt angle of the reflector, to deflect the point structured light reflected from the reflector to the optical conversion device along a preset scanning direction. The optical conversion device is configured for converting the point structured light incident onto the optical conversion device into line structured light. The line structured light is used for forming a pattern that is projected onto a surface of a target object and extends along a direction intersecting with the preset scanning direction.

In the embodiment, the projector (e.g., the projector in FIG. 1) may include a light source, a reflector, and an optical conversion device. The light source control unit 501 of the apparatus 500 for controlling a projector may control the light source to emit point structured light to the reflector.

In some optional implementations of the embodiment, the light source may be a laser light source. Due to excellent directivity, the laser light source may form a clear structured light pattern on a surface of a target object. The laser light source may be a monochromatic light source, e.g., a red laser light source, a green laser light source, or a blue laser light source.

In some optional implementations of the embodiment, the reflector may be a MEMS mirror. The MEMS refers to a micro-device or system that integrates precision processing technologies, such as photoetching, corrosion, and thin film, based on microelectronic technology, and has a production size of a few millimeters or even smaller. The MEMS mirror may have a size of 1 mm to 2 mm, or even smaller. Compared with the conventional reflector, the MEMS mirror may reduce the size of the projector, and reduce costs.

In some optional implementations of the embodiment, the optical conversion device may be a diffractive optical element. The diffractive optical element (DOE for short) may include a plurality of lenses. The DOE can precisely control light intensity distribution while maintaining a high diffraction efficiency. The lenses in the DOE are precisely controlled, thereby implementing converting the point structured light into the line structured light.

In some optional implementations of the embodiment, the optical conversion device may be a grating element. The grating is an optical device that is formed by many fine, equidistant, parallel, equally spaced grooves (e.g., by cutting a surface of a glass sheet or a surface plated with a metal layer to form many parallel cuttings). The grating may include, for example, a transmittance grating diffracting transmitted light, and a reflection grating diffracting reflected light, and may convert the point structured light incident onto the grating to the line structured light by precisely controlling the grooves.

In the embodiment, the benefits of using the diffractive optical element or the grating element are that when the light source is a point light source (e.g., a laser source), the point structured light is converted into the line structured light using a diffractive optical element or a grating element: on the one hand, the reflector may achieve three-dimensional scanning of the target object only by scanning once along a preset scanning direction, thereby greatly improving the efficiency of the three-dimensional scanning; on the other hand, since the reflector only needs to scan once along the preset scanning direction, a reflector rotating around a single axis may be used, thereby reducing the difficulty in controlling the reflector, simplifying the structural design of the reflector, and reducing the control cost and design cost of the projector.

In the embodiment, the tilt angle adjusting unit 502 may adjust a tilt angle of the reflector, e.g., rotating the projector along a rotation axis, to constantly change the tilt angle of the reflector (i.e., constantly changing a propagation direction of light). With the rotation of the tilt angle of the reflector, the point structured light reflected from the reflector to the optical conversion device is deflected along a preset scanning direction. Accordingly, the line structured light converted from the point structured light reflected onto the optical conversion device is also deflected along the preset scanning direction. Thus, a structured light pattern (e.g., a stripe pattern) is formed on the surface of the target object, thereby achieving the three-dimensional scanning (or projection) of the target object.

The optical conversion device is an optical device of converting point structured light incident onto the optical conversion device into the line structured light. The point structured light is used for forming a dot pattern on a surface of an object, and the line structured light is used for forming a line pattern extending along a specific direction on the surface of the object. In the embodiment, the line structured light obtained by the optical conversion device through converting the point structured light may form a line pattern (such as a line) along a direction intersecting (for example, perpendicularly) with the preset scanning direction on the surface of the target object.

In some optional implementations of the embodiment, the apparatus 500 may further include an image acquisition unit and a depth image generation unit. In some embodiments, the image acquisition unit is configured for acquiring an image of the target object; and the depth image generation unit is configured for generating a depth image based on the pattern projected onto the surface of the target object and the image.

The image acquisition unit may acquire an image of the target object with a structured light pattern (e.g., a stripe pattern) projected onto the surface. Here, the image of the target object may be acquired by an image sensor installed on the projector, e.g., acquired by a monocular/binocular photographing component installed on the projector. The image of the target object may alternatively be acquired by an external image sensor (e.g., other camera, video camera, or the like in communication link with the executive subject), and then be acquired by the executive subject.

The depth image generation unit may generate a depth image based on the pattern projected onto the surface of the target object and the image of the target object acquired by the image acquisition unit. The depth image may be an image that contains information about the distance from a surface of a scenario object (e.g., the target object) of a viewpoint. The depth image is similar to a grayscale image, except that a pixel value (e.g., a grayscale value) of each pixel point in the depth image is used for characterizing a distance from a point to a sensor (e.g., an image sensor) in a scenario.

The apparatus for controlling a projector according to the embodiments of the disclosure controls a light source to emit point structured light to a reflector, then adjusts a tilt angle of the reflector to deflect the point structured light reflected from the reflector to an optical conversion device along a preset scanning direction, then converts the point structured light incident onto the optical conversion device into line structured light by the optical conversion device, and then projects the line structured light onto a surface of a target object, thereby improving the efficiency in three-dimensional scanning of the target object.

Figure 6:
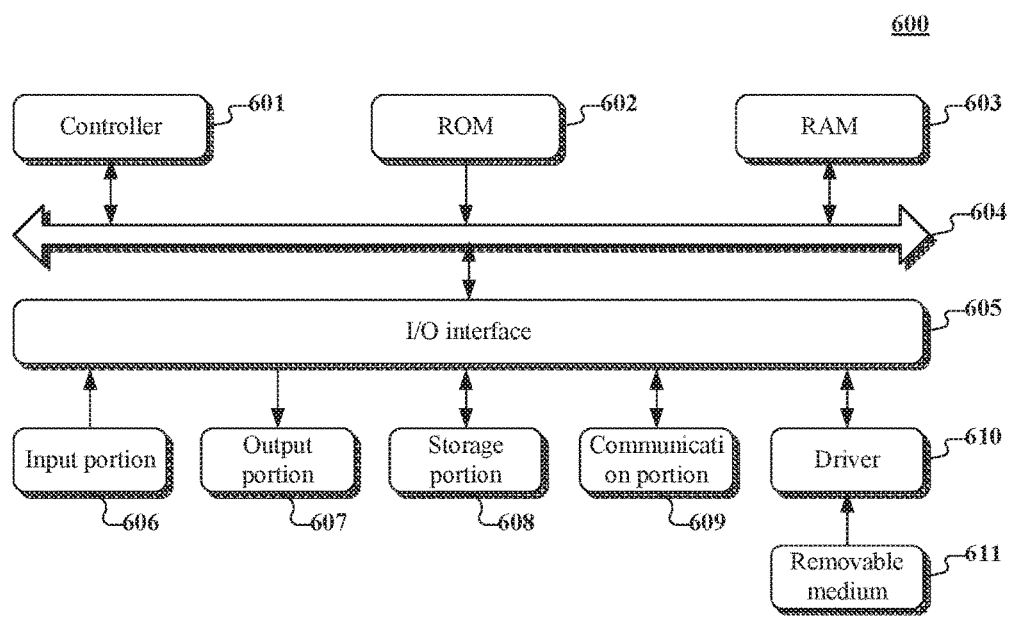
FIG. 6 is a structural schematic diagram of a computer system adapted to implement a projector according to an embodiment of the disclosure.

Referring to FIG. 6, a schematic structural diagram of a computer system 600 adapted to implement a projector of the embodiments of the present disclosure is shown. The computer system shown in FIG. 6 is only an example, and should not limit a function and scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is embedded in a computer-readable medium. The computer program includes program codes for executing the method as illustrated in the flow chart. In such an embodiment, when invoking the computer program to perform control function for the projector, the controller may control the output portion to emit point structured light and perform reflection, light conversion, etc. The computer program may be downloaded and installed from a network via the communication portion 609, and/or may be installed from the removable media 611. The computer program, when executed by the controller 601, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a source control unit and a tilt angle adjusting unit, where the names of these units do not in some cases constitute a limitation to such units themselves. For example, the light source control unit may also be described as "a unit for controlling the light source to emit point structured light to the reflector."

In another aspect, some embodiments of the present disclosure further provide a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: controlling the light source to emit point structured light to the reflector; and adjusting a tilt angle of the reflector to change the tilt angle of the reflector, and to enable the point structured light reflected from the reflector to the optical conversion device to deflect towards a preset scanning direction, the optical conversion device used for converting the point structured light incident onto the optical conversion device into line structured light, the line structured light used for forming a pattern that is projected onto a surface of a target object and extends along a direction intersecting with the preset scanning direction.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling a projector, the projector comprising a light source, a reflector, and an optical conversion device, the method comprising:
controlling the light source to emit point structured light to the reflector; and
adjusting a tilt angle of the reflector to change the tilt angle of the reflector, to deflect, along a preset scanning direction, the point structured light reflected from the reflector to the optical conversion device including first to $n^{th}$ parallel line grooves, n being an integer greater than 1, the optical conversion device being configured for converting the point structured light incident onto the optical conversion device into line structured light, and the line structured light being used for forming a pattern that is projected onto a surface of a target object and extends along a direction intersecting with the preset scanning direction, wherein the adjusting a tilt angle of the reflector to change the tilt angle of the reflector comprises:
controlling, by changing the tilt angle of the reflector to n different angles respectively, the point structured light reflected from the reflector to irradiate the first to $n^{th}$ line grooves one by one to form n line structured lights corresponding to the n angles; and
projecting the n line structured lights corresponding to the n angles onto the surface of the target object to form the pattern with n line areas,
wherein the method is performed by at least one hardware processor.

2. The method according to claim 1, further comprising:
acquiring an image of the target object; and
generating a depth image based on the pattern projected onto the surface of the target object and the image of the target object.

3. The method according to claim 1, wherein the reflector is a micro electro mechanical system (MEMS) mirror, and the optical conversion device is a diffractive optical element.

4. The method according to claim 1, wherein the reflector is a MEMS mirror, and the optical conversion device is a grating element.

5. An apparatus for controlling a projector, the projector comprising a light source, a reflector, and an optical conversion device, the apparatus comprising:
at least one processor; and
a memory storing instructions, wherein the instructions when executed by the at least one processor, cause the at least one processor to perform operations, the operations comprising:
controlling the light source to emit point structured light to the reflector; and
adjusting a tilt angle of the reflector to change the tilt angle of the reflector, to deflect, along a preset scanning direction, the point structured light reflected from the reflector to the optical conversion device including first to $n^{th}$ parallel line grooves, n being an integer greater than 1, the optical conversion device being configured for converting the point structured light incident onto the optical conversion device into line structured light, and the line structured light being used for forming a pattern that is projected onto a surface of a target object and extends along a direction intersecting with the preset scanning direction, wherein the adjusting a tilt angle of the reflector to change the tilt angle of the reflector comprises:
controlling, by changing the tilt angle of the reflector to n different angles respectively, the point structured light reflected from the reflector to irradiate the first to $n^{th}$ line grooves one by one to form n line structured lights corresponding to the n angles; and
projecting the n line structured lights corresponding to the n angles onto the surface of the target object to form the pattern with n line areas.

6. The apparatus according to claim 5, wherein the operations further comprise:
acquiring an image of the target object; and
generating a depth image based on the pattern projected onto the surface of the target object and the image of the target object.

7. The apparatus according to claim 5, wherein the reflector is a MEMS mirror, and the optical conversion device is a diffractive optical element.

8. The apparatus according to claim 5, wherein the reflector is a MEMS mirror, and the optical conversion device is a grating element.

9. A projector, comprising:
a controller including one or more processors;
a light source;
a reflector;
an optical conversion device; and
a memory storing one or more programs, wherein the one or more programs, when executed by the controller, cause the controller to perform operations, the operations comprising:
controlling the light source to emit point structured light to the reflector; and
adjusting a tilt angle of the reflector to change the tilt angle of the reflector, to deflect, along a preset scanning direction, the point structured light reflected from the reflector to the optical conversion device including first to $n^{th}$ parallel line grooves, n being an integer greater than 1, the optical conversion device being configured for converting the point structured light incident onto the optical conversion device into line structured light, and the line structured light being used for forming a pattern that is projected onto a surface of a target object and extends along a direction intersecting with the preset scanning direction, wherein the adjusting a tilt angle of the reflector to change the tilt angle of the reflector comprises:
controlling, by changing the tilt angle of the reflector to n different angles respectively, the point structured light reflected from the reflector to irradiate the first to $n^{th}$ line grooves one by one to form n line structured lights corresponding to the n angles; and
projecting the n line structured lights corresponding to the n angles onto the surface of the target object to form the pattern with n line areas.

10. A non-transitory computer medium, storing a computer program therein, the program, when executed by the at least one processor, causes the at least one processor to implement the method according to claim 1.

* * * * *